United States Patent [19]

Lamoureux

[11] 4,291,816

[45] Sep. 29, 1981

[54] FUEL TANK ACCESS DOOR FOR AIRCRAFT

[75] Inventor: Paul Lamoureux, Montreal, Canada

[73] Assignee: Canadair Limited, Montreal, Canada

[21] Appl. No.: 167,348

[22] Filed: Jul. 9, 1980

[51] Int. Cl.³ .............................................. B65D 45/00
[52] U.S. Cl. ..................................... 220/243; 220/256
[58] Field of Search .............................. 220/243, 256

[56] References Cited

U.S. PATENT DOCUMENTS 2,432,457 12/1947 Stevens ........................... 220/243 X

*Primary Examiner*—George T. Hall
*Attorney, Agent, or Firm*—A. Lebrun

[57] ABSTRACT

A fluid tight closure for an aperture, more particularly adapted to form a fuel tank access door for an aircraft, preferably made of composite material and providing fail-safe features and resistance to lightning strikes; and further characterized by its light weight, relatively low cost of manufacture, and flexibility to bend from a flat to a curved configuration defined by the curvature of a wing. This fluid tight closure comprises an inner door panel and an outer door panel having each a rim portion complementarily shaped relative to each other and to the edge portion of an aperture, and clamping against the opposite sides of the edge portion with an interposed sealing ring and with nuts and screws sealingly extending through the rim portion and holding the same in clamping position.

10 Claims, 3 Drawing Figures

FUEL TANK ACCESS DOOR FOR AIRCRAFT

FIELD OF THE INVENTION

This invention relates to a fluid tight closure for an aperture, and more particularly, to a fuel tank access door for aircraft.

BACKGROUND OF THE INVENTION

The fuel tank access doors used so far to gain access into the fuel tanks in the wings of aircraft, for inspection, present manufacturing and operational difficulties. Since the wings of aircraft are three-dimensionally curved, at least in its bottom skin where the fuel tank access doors are located, and since the wings are dynamic members undergoing twisting and bending movements in flight, the metal doors used so far have to be carefully machined. There has resulted that the fuel tank access doors used so far have been rather expensive to make particularly since such doors have to be leakproof despite all the aforementioned adverse requirements. Another disadvantage of those metal doors is that they cannot readily be made of sheet metal and their manufacturing cost is therefore rather high. This is particularly noticeable since each aircraft is provided with a plurality of such fuel tank access doors.

SUMMARY OF THE INVENTION

It is a general object of the present invention to provide a fluid tight closure that meets the aforementioned requirements and avoids the aforementioned disadvantages of a fuel tank access door for aircraft.

It is a more specific object of the present invention to provide a fluid tight closure particularly adapted to form a fuel tank access door that is made at least in part of graphite/epoxy or fiberglass material to produce a light weight closure or door.

It is another object of the present invention to provide a fluid tight closure for a fuel tank, in particular for an aircraft, that is made partly of graphite/epoxy and partly of fiberglass material and is of fail-safe and low cost construction.

It is a further object of the present invention to provide a fluid tight closure for a fuel tank, in particular for an aircraft, that is made of graphite/epoxy material and ply construction, has sufficient flexibility to be made flat and be sufficiently bendable to conform to a curved outline such as of a wing, upon installation.

BRIEF DESCRIPTION OF THE DRAWINGS

The above and other objects and advantages of the present invention will be better understood with reference to the following detailed description of a preferred embodiment thereof which is illustrated by way of example, in the accompanying drawing; in which.

DESCRIPTION OF THE PREFERRED EMBODIMENT

Figure 1:
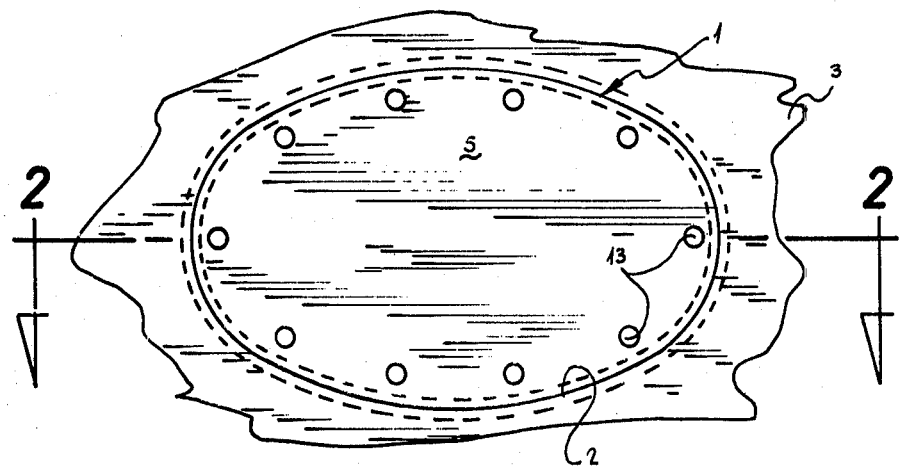
FIG. 1 is a plan view of a fuel tank access door according to the present invention in position in the lower skin of a wing for an aircraft.
Figure 2:
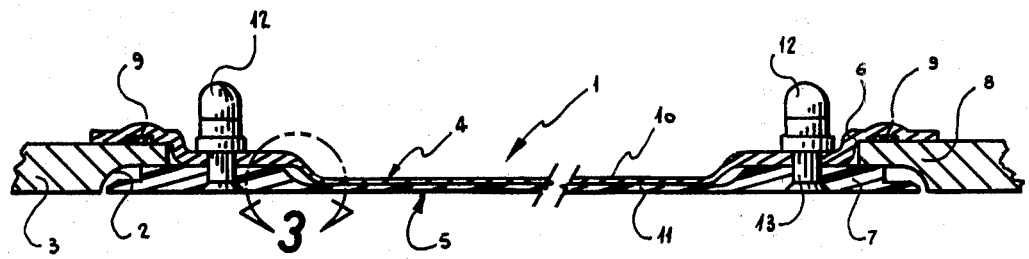
FIG. 2 is a longitudinal cross section as seen along line 2—2 in FIG. 1.

The illustrated fuel tank access door 1, forms a fluid tight closure, for an access aperture 2 in the lower skin 3 of a wing for an aircraft. As is well known, there is a plurality of fuel tank access doors in the wings of the modern aircraft. The fuel tank access door comprises an inner door panel 4 and an outer door panel 5. Each of the door panels 4 and 5 is laminated using plys of graphite/epoxy material such as the pre-impregnated or prepreg cloth No. 5208 marketed by Narmco.

The inner door panel 4 and outer door panel 5 are made with a rim portion 6 and 7 respectively that are complementarily transversely profiled relative to each other and to the edge portion 8 extending along the periphery of the access aperture 2. Thus, the rim portions 6 and 7 are arranged to engage each other and to sealingly clamp against the inner and outer faces respectively of the edge portion 2. A sealing ring 9 is engaged in a recess of the rim portion 6 to extend peripherally of the latter and provide sealing between this rim portion 6 and the edge portion 2. The inner and outer door panels 4 and 5 are formed with a flat central portion 10 and 11 respectively bordered by the corresponding rim portion 6 or 7.

The inner and outer door panels 4 and 5 are fastened in operatively clamping position by means of dome shaped nuts 12 and screws 13. The nuts 12 are secured to the inner door panel 4 on the inner side thereof. The screws 13 extend through the rim portions 7 and 6 to thread into the dome shaped nuts. Thus they clamp the panels 4 and 5 toward engagement of the central portions 10 and 11 with each other and of the rim portions 6 and 7 with each other and with the edge portion 2. The nuts 12 and screws 13 are sealed around for fluid tight connection.

Figure 3:
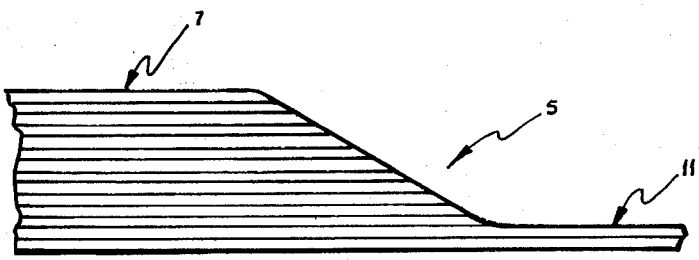
FIG. 3 is an enlarged detailed view taken at 3 in FIG. 2 of a portion of one panel forming the door.

Each door panel 4,5 is made of ply construction, with graphite/epoxy material as shown in FIG. 3 for the outher door panel 5. In this instance, the central portion 10,11 is made of only two plys while the rim portions 6, 7 have more plys. The plys are laid one over the other and cured at the required pressure and temperture to produce bonding by the epoxy. Such curing process is known in the art. In this particular instance good results are obtained by curing at 10 to 15 psi pressure and 260° F., for about 60 minutes, thereafter at 100 psi and 350° F. for 2 to 4 hours, followed by cooling down to 140° F. under pressure.

The rim portions may be otherwise built up such as by molding of chopped fibers in resin.

The outer panel can also be made of other suitable materials such as of aluminum. Similarly, the inner door is made of fiberglass/resin material but can be instead made of suitable non-conducting materials.

The conductive layer on the outer door may be dispensed with if the material of the outer door is found to have sufficient inherent conductivity.

What is claimed is:

1. A fluid tight closure for an access aperture in a fuel tank or the like enclosure and comprising a non-conductive inner door panel, an outer door panel, and fasteners operatively securing said door panels in fluid tight closing position relative to the access aperture, said door panels being of bendable material and having each a rim portion operatively overlapping an edge portion of said access aperture, with said rim portions operatively clamping said edge portion upon engagement with an inner and an outer faces thereof respectively, and sealing means sealingly interposed peripherally of said edge portion intermediate the latter and at least one of said rim portions upon operative fastening of the inner and outer door panels in said fluid tight closing position.

2. A fluid tight closure as defined in claim 1, wherein said inner and outer rim portions are of complementary transverse cross sections relative to each other and relative to said edge portion and operatively produce firm engagement with said edge portion and said interposed sealing means.

3. A fluid tight closure as defined in claim 2, wherein said fasteners include a plurality of nuts secured to one of the door panels and screws engaging the other door panel and operatively engaging the nuts with operative sealing of the screws and nuts against leakage thereat.

4. A fluid tight closure as defined in claim 3, wherein said fasteners include a plurality of dome shaped nuts sealingly secured to the inner door panel against the inside thereof and said screws extend inwardly through the outer door panel and threadably into said dome shaped nuts thereby operatively fastening said door panels.

5. A fluid tight closure as defined in claim 4, wherein said sealing means constitute a sealing ring secured to the rim portion of the inner door panel operatively intermediate the latter and the edge portion of the access aperture.

6. A fluid tight closure as defined in claim 5, wherein each of said door panels includes a thinner central portion bordered by the corresponding rim portion and operatively resting flat against the thinner central portion of the other door panel.

7. A fluid tight closure as defined in claim 1, 2, or 6, further including an electrically conductive surfacing adhered against the outer door panel.

8. A fluid tight closure as defined in claim 6, further including a layer of aluminum foil adhered against the outer door panel and operatively providing electrical conduction to the panel.

9. A fuel tank access door for an aircraft comprising an inner door panel, an outer door panel, a plurality of nuts secured to the inner door panel, screws engaging through the outer door panel and threadably into said nuts with operative sealing of the screws and nuts against leakage thereat, each of the door panels defining a rim portion operatively overlapping an edge portion of an access aperture in a fuel tank of the aircraft, a sealing ring secured along the periphery of the rim portion of the inner door panel operatively intermediate the latter and the edge portion of the access aperture, and said door panels being of bendable graphite/epoxy material with said rim portions operatively clamping said edge portion upon engagement with an inner and an outer faces thereof respectively upon tightening of said screws into said nuts.

10. A fuel tank access door for an aircraft as defined in claim 9, wherein each of said door panels includes a thinner central portion bordered by the corresponding rim portion and made with a relatively small number of plys of graphite/epoxy material and said inner and outer rim portions are of relatively thicker transverse cross sections and made of a larger number of plys of graphite/epoxy material.

* * * * *